United States Patent [19]

Rossi

[11] Patent Number: 5,565,211
[45] Date of Patent: Oct. 15, 1996

[54] COMPOSITION FOR IMPROVING THE DIGESTIBILITY OF FEED INTENDED FOR RUMINANTS

[75] Inventor: Jean Rossi, Bellevue, Switzerland

[73] Assignee: Crina S.A., Gland, Switzerland

[21] Appl. No.: 263,838

[22] Filed: Jun. 22, 1994

[30] Foreign Application Priority Data

Jun. 22, 1993 [CH] Switzerland ............................. 1876/93

[51] Int. Cl.⁶ .............................. A23K 1/18; A23K 1/165
[52] U.S. Cl. ............................................. 424/438; 424/442
[58] Field of Search ..................................... 424/438, 442

[56] References Cited

U.S. PATENT DOCUMENTS

| | | | |
|---|---|---|---|
| 2,871,122 | 1/1959 | Ott | 99/2 |
| 3,171,745 | 3/1965 | Lobel | 99/4 |
| 3,293,038 | 6/1966 | Marco | 99/2 |
| 3,931,412 | 1/1976 | Kensler, Jr. et al. | 424/313 |
| 4,123,552 | 10/1978 | Kensler, Jr. et al. | 424/311 |

FOREIGN PATENT DOCUMENTS

| | | |
|---|---|---|
| 2510875 | 2/1983 | France . |
| 5-000051 | 1/1993 | Japan . |
| 1360228 | 7/1974 | United Kingdom . |

OTHER PUBLICATIONS

By S. Sikka et al., "Evaluation In Vitro of Spent Coffee Grounds as a Livestock Feed", Agricultural Wastes, 1985, vol. 13, No. 4, pp. 315–317.

By J. Nicholson et al., "Herring silage as a protein supplement for young cattle", Can. J. Anim. Sci., Dec. 1991, vol. 71, pp. 1187–1196.

By A. Martin, "The origin of urinary aromatic compounds excreted by ruminants", 1983, vol. 49, pp. 87–99.

Primary Examiner—Thurman K. Page
Assistant Examiner—Sharon Howard
Attorney, Agent, or Firm—Young & Thompson

[57] ABSTRACT

A composition designed for improving the digestibility of feed for ruminants contains as active ingredient an aromatic phenol derivative selected from cresols and benzenediols, as well as an absorbing support and an aromatizing mixture.

9 Claims, No Drawings

COMPOSITION FOR IMPROVING THE DIGESTIBILITY OF FEED INTENDED FOR RUMINANTS

FIELD OF THE INVENTION

The present invention is concerned with a composition for improving the digestibility of feed intended for ruminants. In particular, this composition can be provided in the form of a concentrated mixture designed for incorporation as an additive into the usual feed for ruminants.

BACKGROUND OF THE INVENTION

In ruminants, it is important for the digestibility of the feed that the organic material (in particular, protein and starch) should not undergo too much degradation in the rumen, but that the nutrients be transferred into the small intestine in a less degraded form, so that they may undergo an enzymic digestion which has lesser energy requirements, since it allows an increased production of adenosine triphosphate (ATP).

SUMMARY OF THE INVENTION

The purpose of the present invention is to provide a composition. designed for incorporation into feed for ruminants and which makes it possible to improve substantially the digestibility thereof and, consequently also to improve the growth of ruminants receiving such a feed.

The composition according to the invention aimed at meeting the above objective includes as the active ingredient, an aromatic phenol derivative selected from cresols and benzenediols.

Actually, the present inventors have found unexpectedly that the desired active effect on digestion was obtained by using an aromatic phenol derivative, and more particularly a cresol or a benzenediol, and specially resorcinol (m-benzenediol), or a mixture thereof.

Furthermore, they have also found that the transfer of nutrients, which had undergone less degradation into the small intestine thanks to the composition according to the invention, had another advantage in milking cows, namely a reduction in nitrogenous toxins produced by microbial degradation, which toxins provoke an inflammation of the udder. This inflammation is countered by an immunological reaction with the effect of an important increase in the milk of leukocytes called "somatic cells". Actually, these somatic cells cause problems in cheese making and for this reason, milks containing high levels of somatic cells are paid less to the farmer.

DETAILED DESCRIPTION

Preferably, the aromatic phenol derivatives are incorporated into the animal feed so that their intake be approximately of 1 to 100 mg per animal and per day, depending on the weight of said animal.

The compositions according to the invention intended for incorporation into standard animal feed can include an absorbing support and an aromatizing mixture, to which the active ingredient is added. For instance, the proportion may be as follows:

5 to 10% of the phenol derivative,
20 to 30% of an aromatizing mixture,
and from 60 to 75% of an absorbing support.

Concerning the phenol derivative, use is preferably made of eresol or resoreinol or of a mixture thereof, for example a mixture containing 60 to 90% cresol and 10 to 40% resoreinol.

For example, one can use the following mixtures of absorbing support and of aromatizing mixture.

| (a) Absorbing support: | |
|---|---|
| Sterilized fir tree sawdust | 40–50% |
| Stearin | 8–10% |
| Curcuma powder | 4–5% |
| Rosemary powder | 4–5% |
| Limestone | 22–28% |
| Arabic gum | approx. 2% |
| Water | approx. 10% |
| (b) Aromatizing mixture: | |
| Thymol | 25–35% |
| Guaiacol | 10–15% |
| Eugenol | 5–10% |
| Vanillin | 10–20% |
| Salicylaldehyde | 5–10% |
| Limonene (solvent) | 20–35% |

In practice, the cresol and/or the resoreinol are added to the liquid aromatizing mixture, then this new mixture is incorporated into the absorbing support, for example in a flour mixer.

In principle, for the administration to the animals, the composition according to the invention must be diluted, such a dilution being generally carried out in two steps; in the first one, a concentrated mixture or premix is prepared in which the composition according to the invention is diluted to 0.5–5% and this premix is in the second step mixed into an animal feed of the usual type.

For example, the concentrated mixture or "premix" can have the following composition:

| | |
|---|---|
| Composition according to the invention | 0.3–3% |
| Vitamin mixture (A, B, D, E, niacin, etc) | 0.1–1% |
| Mineral salts ($CaHPO_4$, $CaCO_3$, NaCl, CuO, MnO, $FeSO_4$, ZnO, etc) | 25–75% |
| Wheat middlings and brans | 21–75% |

Again and merely by way of example, the above-mentioned premix can be incorporated into a feed to yield the following preparation:

| | |
|---|---|
| Premix according to the invention | 0.3–3.5% |
| Cereals and peas | approx. 50% |
| Oilmeal (soya, rape, etc) | approx. 25% |
| Wheat middlings and brans | 21–25% |

Such a feed, containing the composition according to the invention and given in the amount of 2 to 10 kg per day per animal, provides daily doses of 5 to 100 mg of cresols and of i to 50 mg of benzenediols.

To demonstrate the efficacy of the composition according to the invention, three trials were carried out respectively to elucidate the effects in the rumen, on the occurrence of somatic cells in the milk and on the growth of the animals.

Trial 1: effects in the rumen

This trial was carried out according to the "in vitro" technique of Menke, using for the incubation:
(a) a feed containing
  30% dried maize silage
  25% dehydrated hay
  15% barley 12.5 % maize 17.5% soya seed oilmeal (b) the juices from the rumen of three animals with a fistula permanently inserted into the rumen; the animals receive feed (a) and the juices are sampled in the fasted state, (c) Mac Dougall's buffer.

The incubation is continued during 48 hours at 39° C. and the different metabolites representative of the digestibility in the rumen are determined after 6 and 48 hours.

The test is repeated 12 times, on the one hand with the feed only (control) and on the other hand with a feed containing the composition according to the invention, more particularly a premix containing 10% of a cresol—resorcinol mixture (75%–25%), 20% of an aromatizing mixture of the type described previously by way of example and 70% of an absorbing support also corresponding to that described by way of example.

The results obtained are given in the following table:

Table of results:

|  | Control | | Feed with master batch of invention | |
| --- | --- | --- | --- | --- |
|  | 6h | 48h | 6h | 48h |
| (A) Precipitable protein (TCA) (mg/100 ml) | 107.88 | 86.31 | 133.69 | 113.63 |
| (B) Ammonia, as nitrogen (mg/100 ml) | 24.19 | 40.32 | 4.83 | 6.75 |
| (C) Total volatile acids (mg/100 ml) | 58.85 | 188.14 | 41.46 | 131.40 |
| (D) Production of gas (mg/100 ml) | 72 | 122 | 56 | 85 |
| (E) Dry substance, degradation in % of the initial value | — | — | 54.12 | 41.28 |

(A) The higher value for the feed with the premix according to the invention indicates that the protein of the feed is better protected.

(B) The important decrease in ammonia (as nitrogen) demonstrates that the protein is better protected and hence undergoes less degradation in the rumen.

(C) The decrease in the total volatile acids indicates that the starch is better protected.

(D) The decrease in the production of gas indicates also that the nutritive organic material undergoes less degradation and is hence better protected.

The results obtained in this test show therefore clearly that in the case of the feed containing the premix according to the invention, the degradation in the rumen is decreased, which improves the digestibility of said feed.

Trial 2: effect on the somatic cells of milk

The test was carried firstly under farm conditions on a herd of 46 milking cows of initially excellent sanitary condition. Half the herd (control) received as feed a usual one, whereas the other half (trial) received a feed supplemented with the premix according to the invention, as it was described previously by way of example. After 6 weeks, the number of somatic cells of the control group was 113,000/ml of milk, whereas that of the control group fell to 99,900/ml of milk.

Another test was carried out on a herd of 50 milking cows of which the initial sanitary condition was average, and which had 395,000 somatic cells per ml of milk. After receiving a feed complemented with the premix according to the invention, this number decreased as follows:

| After 1 week | 305,000/ml of milk |
| --- | --- |
| After 3 weeks | 236,000/ml of milk |
| After 5 weeks | 219,000/ml of milk |
| After 6 weeks | 195,000/ml of milk |
| After 7 weeks | 128,000/ml of milk |

The above results demonstrate clearly that the composition according to the invention makes it possible to reduce considerably the microbial catabolism.

Trial 3: effect on animal growth

This trial was carried out during 35 days under farm conditions on growing cattle. The trial was carried out on two groups of 20 animals, one of which (control group) received a standard feed and the other (trial group) received a feed complemented according to the invention as described by way of example above, in which the amount of active ingredient was approximately 100 mg per 3.3 kg of feed.

The results obtained are as follows:

|  | Control group | Trial group |
| --- | --- | --- |
| Average initial weight (kg) | 185.7 | 185.1 |
| Average final weight (kg) | 227.9 | 233.0 |
| Average daily weight increase (g) | 1206 | 1369 |

The increase found in the growth (+13.5% on the average) can be explained by the improvement of the digestibility of the feed given, which is due to the incorporation of the composition according to the invention.

I claim:

1. A composition for improving the digestibility of feed for ruminants comprising as active ingredient 5 to 10% of an aromatic phenol selected from the group consisting of cresol, resorcinol and a mixture thereof, said cresol being selected from the group consisting of meta-cresol, para-cresol, ortho-cresol; from 20 to 30% of an aromatizing mixture; and from 60 to 70% of an absorbing support.

2. A composition according to claim 1, wherein said active ingredient is a cresol and resorcinol mixture containing 60 to 90% cresol and 10 to 40% resorcinol.

3. A composition according to claim 1, wherein the aromatizing mixture contains from 25 to 35% thymol, from 10 to 15% guaiacol, from 5 to 10% eugenol, from 10 to 20% vanillin, from 5 to 10% salicylaldehyde and from 20 to 35% limonene, the absorbing support contains from 40 to 50% of sawdust, from 8 to 10% stearin, from 4 to 5% curcuma powder, from 4 to 5% rosemary powder, from 22 to 28% limestone, approximately 2% arabic gum and approximately 10% water.

4. A concentrated mixture designed for incorporation into feed for ruminants which contains form 0.3 to 3% of the composition according to claim 1.

5. A mixture according to claim 4, further comprising from 0.1 to 1% of a mixture of vitamins, from 25 to 75% of mineral salts and from 21 to 75% of flour-milling products.

6. A feed for ruminants containing from 0.3 to 3.5% of the concentrated mixture according to claim 4.

7. A feed according to claim 6, which contains approximately 50% of a mixture of cereals and peas, approximately 25% of oilcake meal from cereals and 21 to 25% of flour-milling products.

8. A feed according to claim 6, which contains from 1 to 100 mg of active ingredient for 2 to 10 kg of said feed.

9. Method for improving the digestibility of feed for ruminants which comprises: incorporating an effective amount of an aromatic phenol selected from the group consisting of cresol, resorcinol, and a mixture thereof into the feed, said cresol being selected from the group consisting of meta-cresol, para-cresol and ortho-cresol.

* * * * *